3,341,494
SILICON-CONTAINING POLYMERS AND
THEIR PRODUCTION
Brian Beard Millward, Penycae, Wrexham, Wales, assignor to Monsanto Chemicals Limited, London, England, a British company
No Drawing. Filed Mar. 11, 1965, Ser. No. 439,100
Claims priority, application Great Britain, Mar. 12, 1964, 10,512/64
10 Claims. (Cl. 260—47)

ABSTRACT OF THE DISCLOSURE

This application covers a process for preparing silicon-containing polymers by reacting a polyhydric phenol ether with a halogenated silane in the presence of an acidic reagent. Novel polymers containing recurring diarylamino chain units are also covered by this application.

---

This invention relates to the production of polymers, in particular to the production of silicon-containing polymers having high thermal stability.

The present invention is concerned with polymers containing silicon atoms that are connected through oxygen atoms to aliphatic or aromatic radicals. It provides a method for their production which has certain advantages over other possible methods.

The process of the invention is one for the production of a silicon-containing polymer, in which a polyhydric phenol ether is condensed with a silane of the formula $R_nSiX_{4-n}$ where R is an aromatic or aliphatic radical, X is halogen and $n$ is 1 or 2, by heating in the presence of an acidic reagent.

The term "polyhydric phenol ether" is used to indicate a material in which one or more of the hydroxyl groups of a polyhydric phenol is etherified, a polyhydric phenol being a compound having two or more hydroxyl groups each linked to a carbon atom of an aromatic nucleus.

The invention also includes certain new polymers.

In preferred instances of the process, the ether is a mono- or di-ether of a dihydric phenol. Preferred ethers are those of the m- and p-dihydroxybenzenes and of bisphenols containing two linked phenyl nuclei each carrying a hydroxyl group.

Generally, the most useful polymers are derived from silanes of the formula $R_2SiX_2$, especially by the condensation of these silanes with equimolar or approximately equimolar quantities of the preferred mono- or di-ethers of dihydric phenols.

The halogen of the silane $R_nSiX_{4-n}$ is preferably chlorine, but is can also be bromine.

The acidic reagents used in the process are, in general, reagents capable of splitting an O-alkyl bond, and preferred examples are the Lewis acids and the acid salts of organic bases.

Polyhydric phenol ethers that can be used for the production of polymers according to the present invention include both those where the functional groups, that is to say the ether groups or ether and hydroxy groups, are substituents in a single aromatic nucleus and those where such groups are substituents in different aromatic nuclei. In this latter instance, the nuclei can be linked to each other directly or through one or more other atoms or groups such as an oxygen or sulfur atom or a secondary amino, carbonyl or methylene group. Generally, the aromatic nucleus or nuclei concerned are phenyl or naphthyl nuclei, and of these, phenyl nuclei are usually preferred.

Preferred ethers are the alkyl ethers, particularly those where any ether group is a lower alkoxy group containing not moe than four carbon atoms. The methyl and ethyl ethers are particularly suitable.

Polymers that can be obtained by the present process include materials derived from a polyhydric phenol ether having a nuclear substituent that remains substantially inert during the condensation with the silane, for example, a halogen atom or an alkyl group, but it is often preferred that no such substituent should be present.

Where a radical R in the silane is aromatic, it can be, for example, an aryl radical such as a phenyl, tolyl, naphthyl or biphenylyl radical, or a substituted aryl radical in which the substituent can be a halogen atom, for instance fluorine, chlorine or bromine. Examples of substituted aryl radicals are thus chlorophenyl and chloronaphthyl.

Where a radical R in the silane is aliphatic, it can be, for example, an alkyl radical such as a methyl, ethyl or butyl radical or a substituted alkyl radical such as a halogenoalkyl radical, for example a chloroalkyl radical.

In silanes of the formula $R_2SiX_2$, the two radicals R can be the same or different.

Preferred polymers are often those derived from silanes where each radical R is an unsubstituted aryl or alkyl radical.

The silanes where each radical R is phenyl, for example diphenyldichlorosilane and phenyltrichlorosilane, give polymers having particularly high thermal stabilities. For the production of polymers derived from silanes in which each radical R is aliphatic, the silanes in which R is a methyl group are often preferred.

Where the polyhydric phenol ether is one having a single aromatic nucleus, the functional groups preferably occupy relative positions other than the ortho. Preferred compounds of this type thus include for example m- and p-dialkoxybenzenes, m- and p-alkoxyhydroxybenzenes, 1,3,5-trialkoxybenzenes, 1,4- and 2,7-dialkoxynaphthalenes. Specific examples of such compounds are m-dimethoxybenzene, p-dimethoxybenzene, 3,5-dimethoxytoluene, p - diethoxybenzene, m-methoxyphenol, 1,3,5-trimethoxybenzene and 2,7-dimethoxynaphthalene.

Where the functional groups are substituents in different aromatic nuclei, the ether can be for example a dialkoxybiphenyl, a bis(alkoxyphenyl) ether, a bis(alkoxyphenyl) sulfide, a bis(alkoxyphenyl) alkane, e.g. a bis(alkoxyphenyl) methane or 2,8-bis(alkoxyphenyl) propane, a bis(alkoxyphenyl amine or a bis(alkoxyphenyl) ketone. Specific examples of such compounds are 4,4'-dimethoxydiphenyl, 3,3'-dimethoxydiphenyl ether, 4,4'-diethoxydiphenyl sulfide, 4,4'-dimethoxydiphenylmethane, 2,2-bis(4'-ethoxyphenyl) propane, 4,4'-dimethoxydiphenylamine, 4,4'-diethoxydiphenylamine, 4,4' - dimethoxy-3,3'-dimethyldiphenylamine; 4,4' - dimethoxybenzophenone, 4,4'-dimethoxy-2,2'-dichlorobenzophenone.

Acid reagents that can be used in the process include Lewis acids such as aluminum halides, for example aluminum chloride and aluminum bromide, boron halides, for example boron trichloride and boron trifluoride, and ferric and stannnic halides. The preferred member of this class is aluminum chloride.

Suitable acid reagents also include the acid salts of organic bases, in particular the hydrohalide salts, for example the hydrochlorides, hydrobromides, and hydroiodides of pyridine, quinoline and their homologues, for instance the picolines and methylquinolines. Pyridine hydrochloride and quinoline hydrochloride are preferred reagents of this type.

Also suitable as acid reagents are the hydrohalic acids themselves, especially hydrogen chloride, hydrogen bromide and hydrogen iodide.

The amount of the acid reagent used can vary over a wide range, depending on the type of reagent and the nature of the reactants. Where a Lewis acid is used to promote the reaction between the halosilane and a polyhydric phenol ether in which all the hydroxyl groups of the phenol are etherified, a small quantity of the Lewis acid is usually effective, for example about 0.001 mol per mol of the polyhydric phenol ether. A larger quantity, for example up to 0.1 mol per mol of the polyhydric phenol ether, can be used if desired, however.

Where an acid salt of an organic base or a hydrohalic acid is used, the preferred quantity is usually such that there is present at least 0.1, for example from 0.1 to 1.0, molar equivalent per ether group of the polyhydric phenol ether. Where the polyhydric phenol ether is one containing a free hydroxyl group, acid salts or organic bases are the preferred class of acid reagent. In these instances a hydrohalide salt (the particular hydrohalide depending on the halogen in the silane) can be formed in situ. An organic base, added to the reaction mixture as such, is converted to the hydrohalide salt by acquiring the hydrogen halide eliminated by reaction of a halogen atom of the silane with the free hydroxyl group of the polyhydric phenol ether. The amount of organic base used is preferably about 1 molar equivalent, for example from 0.9 to 1.1 molar equivalents, per free hydroxyl group of the polyhydric phenol ether.

The process is usually carried out by heating at a temperature of at least 100° C., and preferably at a temperature within the range 150 to 350° C., for example at 200°, 250° or 340° C.

The process can, in many instances, be conducted satisfactorily at atmospheric pressure. Elevated pressures can, however, be used and in some cases, for example where the groups R in the silane are lower alkyl groups, or where the acid reagent is a hydrohalic acid, it is usually necessary to operate under an elevated pressure to give the required reaction temperature.

Normally the quantities of the silane and polyhydric phenol ether employed are such that a halogen atom of the silane is available for reaction with each functional group of the polyhydric phenol ether. The use of a slight excess of the ether can, however, be an advantage in certain instances where maximum hydrolytic stability of the product is desired, while the use of an excess of the silane can give a product containing residual reactive halogen atoms and which is, therefore, capable of functioning as an intermediate.

The reaction of a silane having the formula $R_2SiX_2$ with a polyhydric phenol ether containing two functional groups gives a polymer having a predominantly linear structure. Such polymers are often particularly useful. The use of a trihalogenosilane or a polyhydric phenol ether containing more than two functional groups gives cross-linked structures. If desired, a polymer in which both types of structure are present can be produced from a mixture of silanes or a mixture of different polyhydric phenol ethers.

For given reactants at a particular reaction temperature, the nature of the product depends on the reaction time. During the early stages of the process, the reaction mixture is soluble in solvents such as chloroform, and if allowed to cool, is a viscous oil. As heating is continued, the viscosity of the reaction mixture progressively increases, and the product may eventually set to a solid mass at the reaction temperature or on cooling. Such solids are insoluble in chloroform.

These characteristics of the process make it possible to produce a product in which the polymer is reinforced, as for example by glass or asbestos fibers. The reinforcing material can be introduced into an intermediate liquid or soluble polymer, and the heating can then be continued, for instance in a mold, to give a solid final polymer.

The new polymers of the invention are materials having molecules containing recurring chain units of the structure:

in which each R is an aliphatic or aromatic group, and A is a diarylamine radical.

Where R is an aliphatic radical, it is preferably an alkyl group, particularly a lower member of the series, for example a methyl or ethyl group.

Where resistance to high temperatures is required, polymers where both R's in the above formula represent aromatic groups (as exemplified above with reference to the silane that can be used in the process of the invention) are generally preferred, particularly polymers where both R's represent unsubstituted phenyl groups.

In the diarylamine radical, both aryl nuclei are preferably unsubstituted phenyl nuclei, although one or both can be for example a naphthyl, tolyl or chlorophenyl nucleus. Preferably in the chain unit of the above formula, one of the oxygen atoms is linked to one of the aryl nuclei in the diarylamine radical while the second oxygen atom is linked to the other aryl nucleus.

Examples of the new polymers are a polymer having molecules containing recurring chain units of the structure:

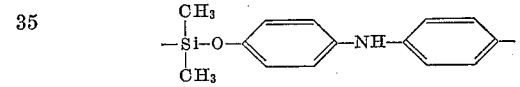

and a polymer having molecules containing recurring chain units of the structure:

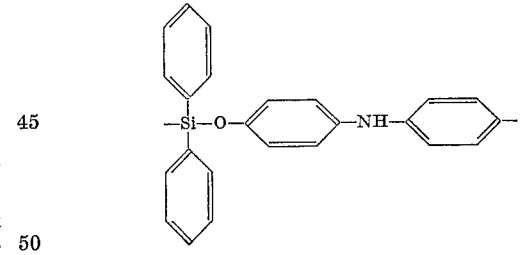

These polymers are obtained by the condensation of a 4,4'-dialkoxydiphenylamine, for example 4,4'-dimethoxydiphenylamine, with respectively a dimethyldihalosilane, for example dimethyldichlorosilane, or a diphenyldihalosilane, for example diphenyldichlorosilane. Similar polymers can be obtained by the condensation of these halosilanes with for example 3,3'-dimethyl-4,4'-dimethoxydiphenylamine and N(4'- methoxyphenyl) - 6 - methoxy-2-naphthylamine.

EXAMPLE 1

This example describes the production of a polymer from diphenyldichlorosilane and p - dimethoxybenzene using aluminum chloride as a catalyst.

A mixture of 10 cc. (0.0475 mol) of diphenyldichlorosilane and 6.56 grams (0.0475 mol) of p-dimethoxybenzene containing a crystal of anhydrous aluminum chloride was heated at 200° C. for 15 hours. Methyl chloride boiled out, and about 3 cc. (about 0.06 mol) were collected in a cold trap. The product set to a light-brown glass on cooling.

The experiment was repeated but at a higher temperature obtained by allowing the mixture to reflux gently. The viscosity of the mixture increased progressively, and it eventually set to a yellow infusible glass having a foamed structure. 3.2 cc. (0.064 mol) of methyl chloride was collected in the cold trap together with about 0.1 cc. of benzene.

EXAMPLE 2

This example describes the production of a polymer from diphenyldichlorosilane and p-diethoxybenzene.

A mixture of 10 cc. (0.0475 mol) of diphenyldichlorosilane and 7.9 grams (0.0475 mol) of p-diethoxybenzene containing a crystal of anhydrous aluminum chloride was heated at 200° C. for 9½ hours. Ethyl chloride boiled out, and was collected in a cold trap. The viscosity of the mixture increased progressively, and toward the end of the 9½ hour period was such that bubbles of ethyl chloride vapor failed to escape and the mass foamed. The foam was broken by raising the temperature to 270° C. On cooling, the product was a solid having a slightly rubbery consistency. The volume of ethyl chloride collected was 3.1 cc. (0.046 mol).

EXAMPLE 3

This example describes the production of a polymer from phenyltrichlorosilane and p-dimethoxybenzene.

A mixture of 5.05 cc. (0.032 mol) of phenyl trichlorosilane and 6.56 grams (0.0475 mol) of p-dimethoxybenzene containing a crystal of anhydrous aluminum chloride was heated at refluxing temperature. The polymer began to foam after about 2 hours and soon set to an infusible yellow mass. Methyl chloride boiled out during the polymerisation, and about 3.2 cc. was collected in a cold trap.

EXAMPLE 4

This example describes the production of a polymer from diphenyldichlorosilane and 3-methoxyphenol.

A mixture of 9.7 cc. (0.046 mol) of diphenyldichlorosilane, 5 cc. (0.046 mol) of 3-methoxyphenol, and 5.95 cc. (0.05 mol) of quinoline was boiled under reflux for 17 hours.

The gases evolved, which included a considerable amount of hydrogen chloride, were passed through a cold trap, in which 2 cc. (88% of the theoretical) of methyl chloride condensed. The product was washed with chloroform and water leaving a black solid.

EXAMPLE 5

This example describes the production of a new polymer from diphenyldichlorosilane and 4,4'-dimethoxydiphenylamine.

A mixture of 7.5 cc. (0.036 mol) of diphenyldichlorosilane and 7.1 grams (0.036 mol) of 4,4'-dimethoxydiphenylamine containing a crystal of anhydrous aluminum chloride was boiled under reflux for 6 hours. The temperature of the reaction mixture was then raised to 340° C. and maintained there for 1½ hours. The total methyl chloride evolved was 79% of the theoretical amount. The product was finally heated under reduced pressure for a short time giving a hard polymer having the appearance of a black honeycombed glass.

EXAMPLE 6

This example describes the production of a polymer from diphenyldichlorosilane and 4,4'-dimethoxybenzophenone.

A mixture of 10 cc. (0.0475 mol) of diphenyldichlorosilane and 11.5 grams (0.0475 mol) of 4,4'-dimethoxybenzophenone containing a crystal of anhydrous aluminum chloride was boiled under reflux for 6 hours. The temperature of the mixture was then raised to 340° C. and held there for 1½ hours. Methyl chloride evolved during the process was collected in a cold trap. The amount produced was 80% of the theoretical. The product was finally heated at 320° C. under reduced pressure, giving a hard polymer having the appearance of a black honeycombed glass and which was insoluble in a wide range of solvents.

EXAMPLE 7

This example describes the production of a polymer from dimethyldichlorosilane and 1,4-dimethoxybenzene.

A mixture of 6.2 grams (0.048 mol) of dimethyldichlorosilane and 6.63 grams (0.048 mol) of 1,4-dimethoxybenzene containing a crystal of anhydrous aluminum chloride was heated in a steel autoclave, at 240° C. for 3½ hours, and then at 265 to 270° C. for a further 2 hours. The pressure gradually increased during the process.

After cooling, the autoclave was vented to a cold trap in which about 1.2 cc. of methyl chloride were collected. The main product was a brown polymer.

While the invention has been described herein with regard to certain specific embodiments, it is not so limited. It is to be understood that variations and modifications thereof may be made by those skilled in the art without departing from the spirit and scope of the invention.

What is claimed is:

1. A process for the production of a silicon-containing polymer which comprises contacting a polyhydric phenol ether selected from the group consisting of

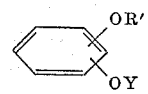

and

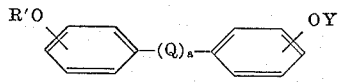

wherein R' is lower alkyl, Y is selected from the group consisting of hydrogen and R', $a$ is an integer from zero to one, and Q is selected from the group consisting of oxygen, sulfur, carbonyl, secondary amino and methylene, with a silane of the formula $R_nSiX_{4-n}$ wherein $n$ is an integer from one to two, R is selected from the group consisting of phenyl and lower alkyl, and X is selected from the group consisting of chlorine and bromine, such contacting being carried out at a temperature of at least about 100° C. and in the presence of an acidic reagent selected from the group consisting of Lewis acids, hydrohalic acids and the hydrohalide salts of pyridine, picoline, quinoline and methylquinoline.

2. A process as defined in claim 1 wherein said contacting is at a temperature of from about 100° C. to about 350° C.

3. A process as defined in claim 1 wherein said ether is di(lower alkoxy) benzene, said silane is diphenyldichlorosilane, and said acidic reagent is a Lewis acid.

4. A process as defined in claim 1 wherein said ether is lower alkoxy phenol, said silane is diphenyldichlorosilane, and said acidic reagent is a Lewis acid.

5. A process as defined in claim 1 wherein said ether is a di(lower alkoxy) bicyclic, said silane is diphenyldichlorosilane, and said acidic reagent is a Lewis acid.

6. A process as defined in claim 1 wherein said ether is a di(lower alkoxy) ether, and said acidic reagent is Lewis acid, about 0.001 to 0.1 mol of acid being employed per mol of ether.

7. A process as defined in claim 1 wherein said ether is a mono-ether, and said acidic reagent is selected from the group consisting of said hydrohalic acids and said hydrohalide salts, about 0.1 mol to 1.0 mol of acidic reagent being employed per mol of ether.

8. A polymeric material consisting essentially of recurring units of the formula,

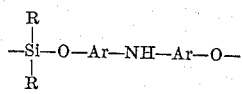

wherein R is selected from the group consisting of phenyl and lower alkyl, and Ar is selected from the group consisting of phenyl, tolyl, naphthyl and chlorophenyl.

9. A polymeric material as defined in claim 8 wherein Ar is phenyl and R is lower alkyl.

10. A polymeric material as defined in claim 8 wherein Ar is phenyl and R is phenyl.

No references cited.

WILLIAM H. SHORT, *Primary Examiner.*

M. GOLDSTEIN, *Assistant Examiner.*